(12) United States Patent
Noguchi et al.

(10) Patent No.: US 6,800,222 B1
(45) Date of Patent: Oct. 5, 2004

(54) ELECTRODE FOR ELECTRIC DOUBLE-LAYER CAPACITOR, AND SLURRY FOR FORMING THE SAME

(75) Inventors: Minoru Noguchi, Wako (JP); Manabu Iwaida, Wako (JP); Naohiko Oki, Wako (JP); Eisuke Komazawa, Wako (JP); Takahiro Takeshita, Wako (JP); Kenichi Murakami, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 11 days.

(21) Appl. No.: 09/635,235

(22) Filed: Aug. 9, 2000

(30) Foreign Application Priority Data

Aug. 10, 1999 (JP) ............................................ 11-226717
Oct. 27, 1999 (JP) ............................................ 11-305814
Nov. 1, 1999 (JP) ............................................ 11-311540

(51) Int. Cl.[7] ........................... H01M 4/58; H01G 9/042
(52) U.S. Cl. .................... 252/502; 252/511; 429/231.4; 429/231.8; 361/508
(58) Field of Search ................................. 252/502, 511; 429/231.8, 231.4; 361/508; 502/418

(56) References Cited

U.S. PATENT DOCUMENTS

| | | | | |
|---|---|---|---|---|
| 4,602,426 A | * | 7/1986 | Kampe et al. | ................. 264/41 |
| 5,450,279 A | * | 9/1995 | Yoshida et al. | ............. 361/502 |
| 6,118,650 A | * | 9/2000 | Maeda et al. | ................ 361/508 |

FOREIGN PATENT DOCUMENTS

| | | | | |
|---|---|---|---|---|
| EP | 0927778 | * | 7/1999 | ........... D01F/9/145 |
| JP | 927778 A1 | * | 7/1999 | ........... D01F/9/145 |

* cited by examiner

*Primary Examiner*—Mark Kopec
*Assistant Examiner*—Kallambella Vijayakumar
(74) *Attorney, Agent, or Firm*—Arent Fox, PLLC

(57) ABSTRACT

In an electric double-layer capacitor, a solution of a quaternary ammonium borofluoride compound in propylene carbonate is used as an electrolyte. The electrode includes alkali-activated carbon made using meso-phase pitch as a starting material, and a conductive filler having a rest potential smaller than that of the alkali-activated carbon in the electrolyte. The amount Fc of conductive filler incorporated in the electrode is set in a range of 10% by weight $\leq Fc \leq 40\%$ by weight. Such electric double-layer capacitor has a large electrostatic capacity and excellent durability.

3 Claims, 11 Drawing Sheets n : DEGREE OF POLYMERIZATION

ELECTRODE FOR ELECTRIC DOUBLE-LAYER CAPACITOR, AND SLURRY FOR FORMING THE SAME

BACKGROUND OF THE INVENTION

1. Field of the Invention

The present invention relates to an electrode for an electric double-layer capacitor, and a slurry for forming the electrode.

2. Description of the Related Art

There is a conventionally known electric double-layer capacitor made using a solution of quaternary ammonium borofluoride compound in propylene carbonate as an electrolyte. Vapor-activated carbon having a turbulent structure is used as activated carbon in electrodes of the electric double-layer capacitor, namely, positive and negative electrodes.

With the electric double-layer capacitor provided with the positive and negative electrodes made from the activated carbon described above, a relatively large electrostatic capacity can be provided, but in order to meet the demand as an energy source for a hybrid-type automobile, for example, a further increase in electrostatic capacity is desired.

To meet such demand, the present inventors have made various studies, and as a result, they have reached the consideration of alkali-activated carbon made from meso-phase pitch as a starting material for use as activated carbon for the positive and negative electrodes. The alkali-activated carbon has a graphite structure of a good electric conductivity incorporated in a surface of particles of the activated carbon, thereby realizing the maintaining of a high density and a low resistance. With the electric double-layer capacitor including the positive and negative electrodes made using such alkali-activated carbon the electrostatic capacity can be increased remarkably more than that in the conventionally known capacitor.

However, as a result of studies further advanced, it has been found that the rest potential of the alkali-activated carbon in an electrolyte is offset relatively largely toward an oxidizing reaction region from an ideal rest potential of the activated carbon, and for this reason, there is a possibility that an oxidizing reaction may be liable to occur in the positive electrode during charging, whereby the durability of the electric double-layer capacitor may be impeded.

There is a conventionally known electrode for an electric double-layer capacitor, which includes an active material and a conductive material and is connected to a current collector.

When the resistance of contact between the current collector and the electrode is high, an increase in internal resistance of the electric double-layer capacitor is brought about. Therefore, to decrease the contact resistance, for example, the following measures are conventionally employed: a measure of subjecting a current collector made of an aluminum foil to an etching treatment to increase the contact area, and a measure of bonding an electrode to a current collector by an adhesive containing a conductive filler and then subjecting the collector and the electrode to burring or punching to enhance the close contact between the collector and the electrode.

However, the conventional measures are incapable of decreasing the contact resistance to an expected extent even with a high working cost. Therefore, a further decrease in contact resistance is desired.

Further, there is a conventionally known electrode for an electric double-layer capacitor, which is formed using a slurry under utilization of a doctor blade process.

Such a slurry conventionally contains CMC (sodium carboxymethyl cellulose) added as a thickening agent in addition to activated carbon, a conductive filler and a binder.

It may be contemplated that activated carbon made from meso-phase pitch as a starting material, i.e., meso-phase activated carbon is used as the above-described activated carbon to aim at an increase in electrostatic capacity. However, the following problem is encountered: This meso-phase activated carbon is liable to be agglomerated in a slurry, because it has a high water-absorbing ability, and when an agglomeration has been produced, the thickness and density of the formed electrode are non-uniform, resulting in decreases not only in performance but also in strength of the electrode.

SUMMARY OF THE INVENTION

Accordingly, it is an object of the present invention to provide an electrode of the above-described type which is formed using a particular material including the above-described alkali-activated carbon as a main component and which is capable of increasing the electrostatic capacity of an electric double-layer capacitor of the above-described type and enhancing the durability of the capacitor.

To achieve the above object, according to the present invention, there is provided an electrode for an electric double-layer capacitor, which is formed using a solution of a quaternary ammonium borofluoride compound in propylene carbonate as an electrolyte, wherein the electrode includes alkali-activated carbon made from meso-phase pitch as a starting material, and a conductive filler having a rest potential smaller than that of the alkali-activated carbon in the electrolyte, the amount Fc of conductive filler incorporated being in a range of $10\%$ by weight $\leq Fc \leq 40\%$ by weight.

If the electrode is formed as described above, the rest potential of the alkali-activated carbon can be shifted toward an ideal rest potential for the activated carbon. Thus, it is possible to conduct the charging of the electric double-layer capacitor within a usable potential window of the electrolyte to prevent the occurrence of an oxidizing reaction in a positive electrode.

However, if the amount Fc of conductive filler incorporated is lower than $10\%$ by weight, there is no adding effect. On the other hand, if the amount Fc of conductive filler incorporated is higher than $40\%$ by weight, the electrostatic capacity of the electric double-layer capacitor is decreased suddenly.

It is another object of the present invention to provide an electrode of the above-described type, wherein the resistance of contact between the current collector and the electrode can be decreased by improving the structure of the electrode.

To achieve the above object, according to the present invention, there is provided an electrode for an electric double-layer capacitor, which includes an active material and a conductive material and which is bonded to a current collector, wherein the concentration of the conductive material in a surface portion of the electrode bonded to the current collector is higher than the concentration of the conductive material in an internal portion of the electrode.

If the electrode is formed as described above, a reduction in resistance of the surface portion of the electrode can be realized to decrease the resistance of contact between the surface portion of the electrode and the current collector, thereby decreasing the internal resistance of the electric double-layer capacitor.

It is a further object of the present invention to provide a slurry of the above-described type in which meso-phase activated carbon can be dispersed homogeneously or substantially homogeneously by using particular CMC (sodium carboxymethyl cellulose), and from which an electrode having a high strength can be formed.

To achieve the above object, according to the present invention, there is provided an slurry for forming an electrode for an electric double-layer capacitor, which includes meso-phase activated carbon and CMC, the degree De of etherification of the CMC being in a range of $0.6 \leq De \leq 0.9$.

If CMC as described above is used, the dispersion property of the meso-phase activated carbon can be improved to provide an electrode strength increasing effect provided by the meso-phase activated carbon and an electrode strength increasing effect exhibited by the CMC itself, namely, by a carboxymethyl group. Therefore, if the slurry is used, it is possible to produce an electrode whose productivity can be enhanced under utilization of a doctor blade process, and which has a high electrostatic capacity and an excellent durability.

However, if the degree De of etherification of the CMC is lower than 0.6, the dispersion property of the meso-phase activated carbon is good, but the strength of the electrode is low, because the amount of carboxymethyl groups is small. On the other hand, if De >0.9, the amount of carboxymethyl groups is increased and hence, the strength of the electrode must be increased intrinsically. However, the dispersion property of the meso-phase activated carbon is degraded and as a result, the strength of the electrode is decreased.

It is a yet further object of the present invention to provide an electrode which has a high strength and which is produced using particular CMC.

To achieve the above object, according to the present invention, there is provided an electrode for an electric double-layer capacitor, which includes meso-phase activated carbon and CMC, the degree De of etherification of the CMC being in a range of $0.6 \leq De \leq 5\ 0.9$.

With the above configuration, it is possible to provide an electrode for an electric double-layer capacitor, which has a high strength.

The above and other objects, features and advantages of the invention will become apparent from the following description of the preferred embodiments taken in conjunction with the accompanying drawings.

DESCRIPTION OF THE PREFERRED EMBODIMENTS

Embodiment I

Figure 1:
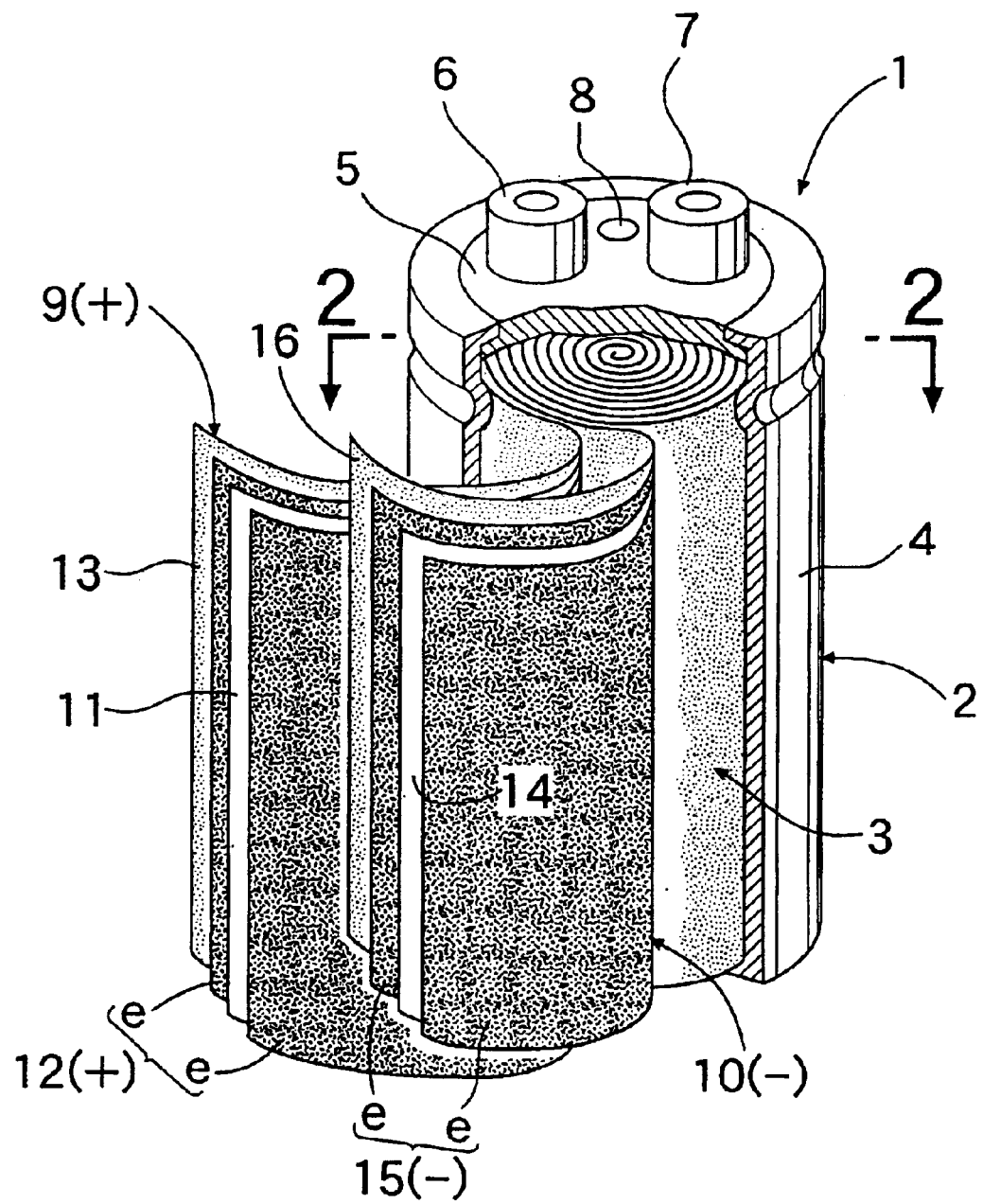
FIG. 1 is a cut-away perspective view of an essential portion of a cylindrical electric double-layer capacitor.
Figure 2:
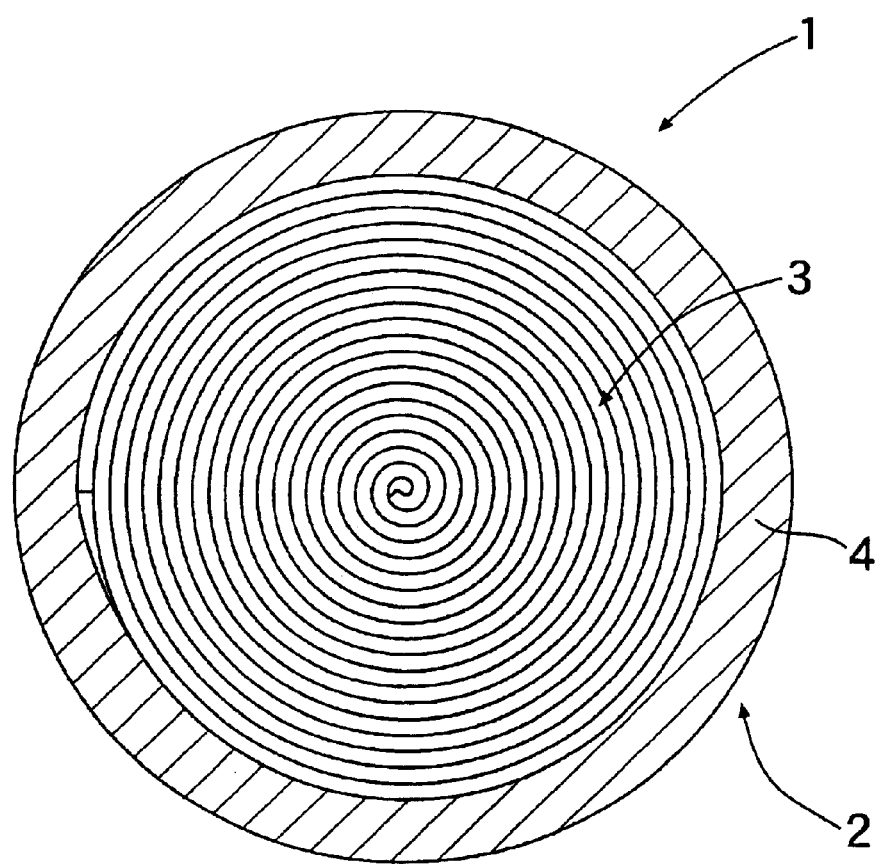
FIG. 2 is a sectional view taken along a line 2—2 in FIG. 1.

Referring to FIGS. 1 and 2, a cylindrical electric double-layer capacitor 1 includes a container 2 made of aluminum (Al), an electrode winding 3 accommodated in the container 2, and an electrolyte poured in the container 2. The container 2 is comprised of a bottomed cylindrical body 4, and a terminal plate 5 which closes an opening in one end of the body 4. Positive and negative terminals 6 and 7 and a safety valve 8 are provided on the terminal plate 5.

The electrode winding 3 has a positive electrode laminated band 9 and a negative electrode laminated band 10. The positive electrode laminated band 9 comprises a band-shaped current colletor 11 made of an aluminum foil and having band-shaped polarizing electrodes e affixed respectively to opposite surfaces thereof by a conductive adhesive, and a first separator 13 made of PTFE (polytetrafluoroethylene) and superposed onto one of the band-shaped polarizing electrodes e. A band-shaped positive electrode 12 which is one of electrodes is formed by the pair of polarizing electrodes e. An electrolyte is retained in the first separator 13 in an impregnated manner. The negative electrode laminated band 10 comprises a band-shaped current colletor 14 made of an aluminum foil and having band-shaped polarizing electrodes e affixed respectively to opposite surfaces thereof by a conductive adhesive, and a second separator 16 made of PTFE and superposed onto one of the band-shaped polarizing electrodes e. A band-shaped negative electrode 15 which is the other electrode is formed by the pair of polarizing electrodes e. An electrolyte is retained in the second separator 16 in an impregnated manner.

To produce the electrode winding 3, the second separator 16 of the negative electrode laminated band 10 is superposed onto the exposed polarizing electrode e of the positive electrode laminated band 9. The resulting superposed material is wound spirally, so that the first separator 13 of the positive electrode laminated band 9 is located on an outermost side.

In the electric double-layer capacitor, the combination of a solution of quaternary ammonium borofluoride compound (which is an electrolyte) such as a solution of $TEMA.BF_4$ $[(C_2H_5)_3CH_3N.BF_4$ (triethylmethyl ammonium borofluoride), as a solute] in PC (propylene carbonate, as a solvent) with the positive and negative electrodes made using vapor-activated carbon having a turbulent layer structure is electrochemically ideal. Therefore, in the electric double-layer capacitor made using such combination, the relationship between the potential (V vs $Ag/Ag^+$) of the electrolyte made by dissolving 1.4 moles of $TEMA.BF_4$ in the PC solvent and reaction current at such potential was examined, thereby providing a result represented by a curve C shown in FIG. 3.

Figure 3:
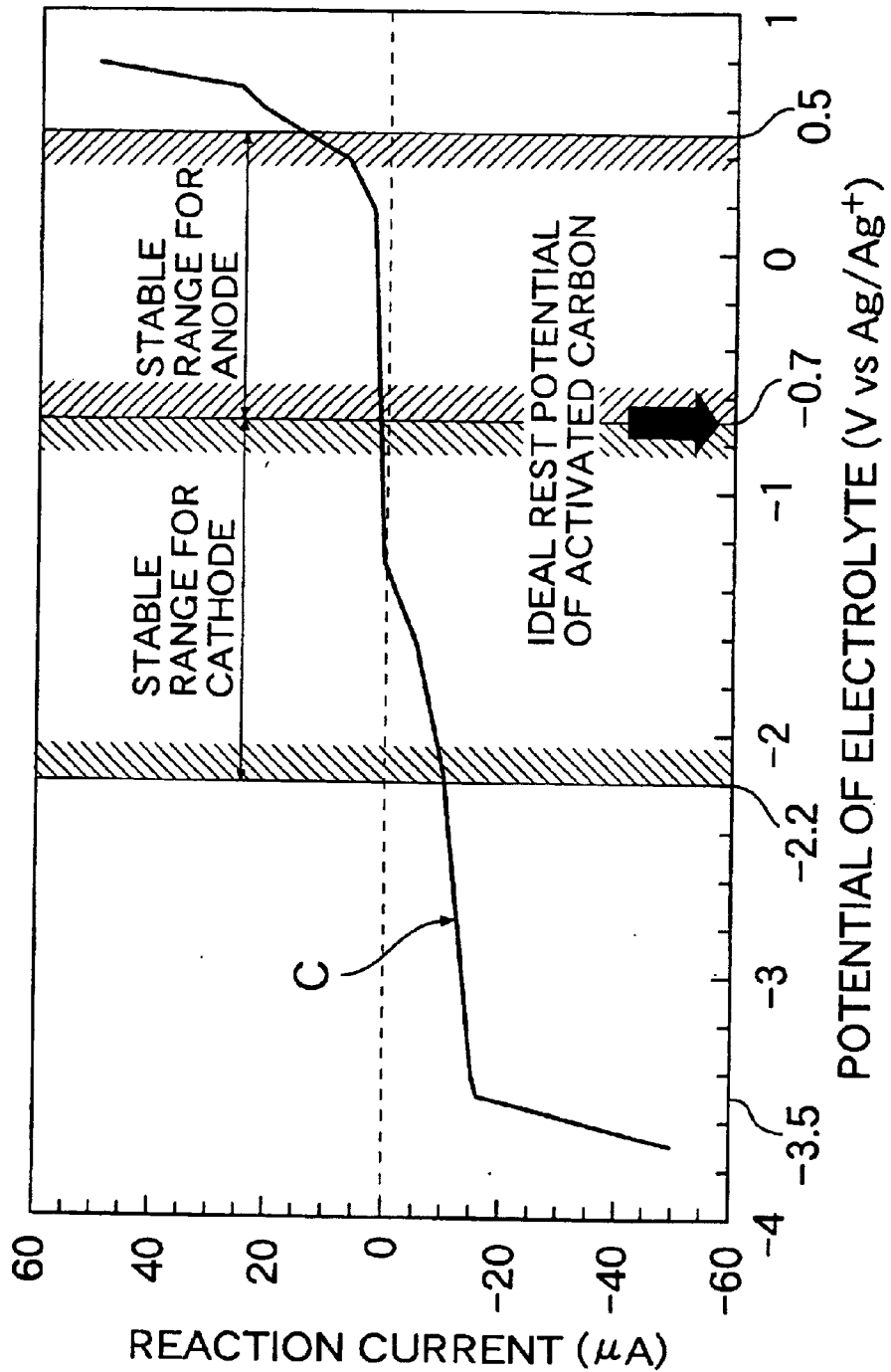
FIG. 3 is a graph showing the relationship between the potential of an electrolyte and the reaction current.

In FIG. 3, positive current is oxidation current, and negative current is reduction current. It can be seen from FIG. 3 that on an oxidation current side, the oxidation current suddenly flows from the time when the potential of the electrolyte is about 0.5 V, and on a reduction current side, the reduction current suddenly flows from the time when the potential of the electrolyte is about −3.5 V.

A ratio in weight of the positive electrode to the negative electrode was changed, and the usable potential window of the electrolyte was examined. As a result, it was ascertained that the potential window at charged voltage of 2.7 V is in a range of 0.5 V on a positive pole side and −2.2 V on a negative pole side.

Further, a preferred ratio in weight of the positive electrode to the negative electrode, namely, a ratio of voltage borne by the positive electrode to voltage borne by the negative electrode was examined from the relationship between the charging and discharging cycle and the electrostatic capacity. As a result, it was ascertained that if the ratio in weight of the negative electrode to the positive electrode is set at 1:0.8, the decrement in electrostatic capacity attendant on an increase in the charging and discharging cycle was smallest. Therefore, the usable potential window of the electrolyte was divided into the ratios of voltage borne by the positive electrode to voltage borne by the negative electrode. As a result, it was ascertained that a range of −0.7 to 0.5 V was a stable range for the positive electrode; a range of −0.7 to −2.2 V was a stable range for the negative electrode, and an ideal rest potential of the activated carbon was −0.7 V.

Next, alkali-activated carbon, e.g., KOH-activated carbon in the embodiment, was produced as activated carbon from meso-phase pitch as a starting material by the following process:

(a) Massive meso-phase pitch was subjected to a pulverizing treatment at room temperature to produce a powder having an average particle size of 300 $\mu$m. Then, the powder was subjected to an insolubilizing treatment at 350° C. for 2 hours in the atmosphere and then to a carbonizing treatment at 700° C. for 1 hour in a nitrogen atmosphere, thereby producing a carbonized powder. (b) The carbonized powder and an amount of KOH two times the weight of the carbon of the carbonized powder were mixed together and then, the mixture was subjected to a potassium activating treatment as an alkali activating treatment at 800° C. for 5 hours in a nitrogen atmosphere, followed by post-treatments, i.e., the neutralization with hydrochloric acid, the washing and the drying, thereby producing KOH-activated carbon. (c) The KOH-activated carbon was subjected to a pulverizing treatment using a jet mill to provide a fine KOH-activated carbon powder having an average particle size of 30 $\mu$m. The fine KOH-activated carbon powder will be referred merely to as a KOH-activated carbon powder hereinafter.

A rest potential of the KOH-activated carbon was examined using the above-described electrolyte with the ratio of voltage borne by the positive electrode to voltage borne by the negative electrode being set at a value similar to that described above. As a result, it was ascertained that the rest potential was −0.392 V. This rest potential is offset relatively largely from the ideal rest potential (−0.7V) to the oxidizing reaction region.

Figure 4:
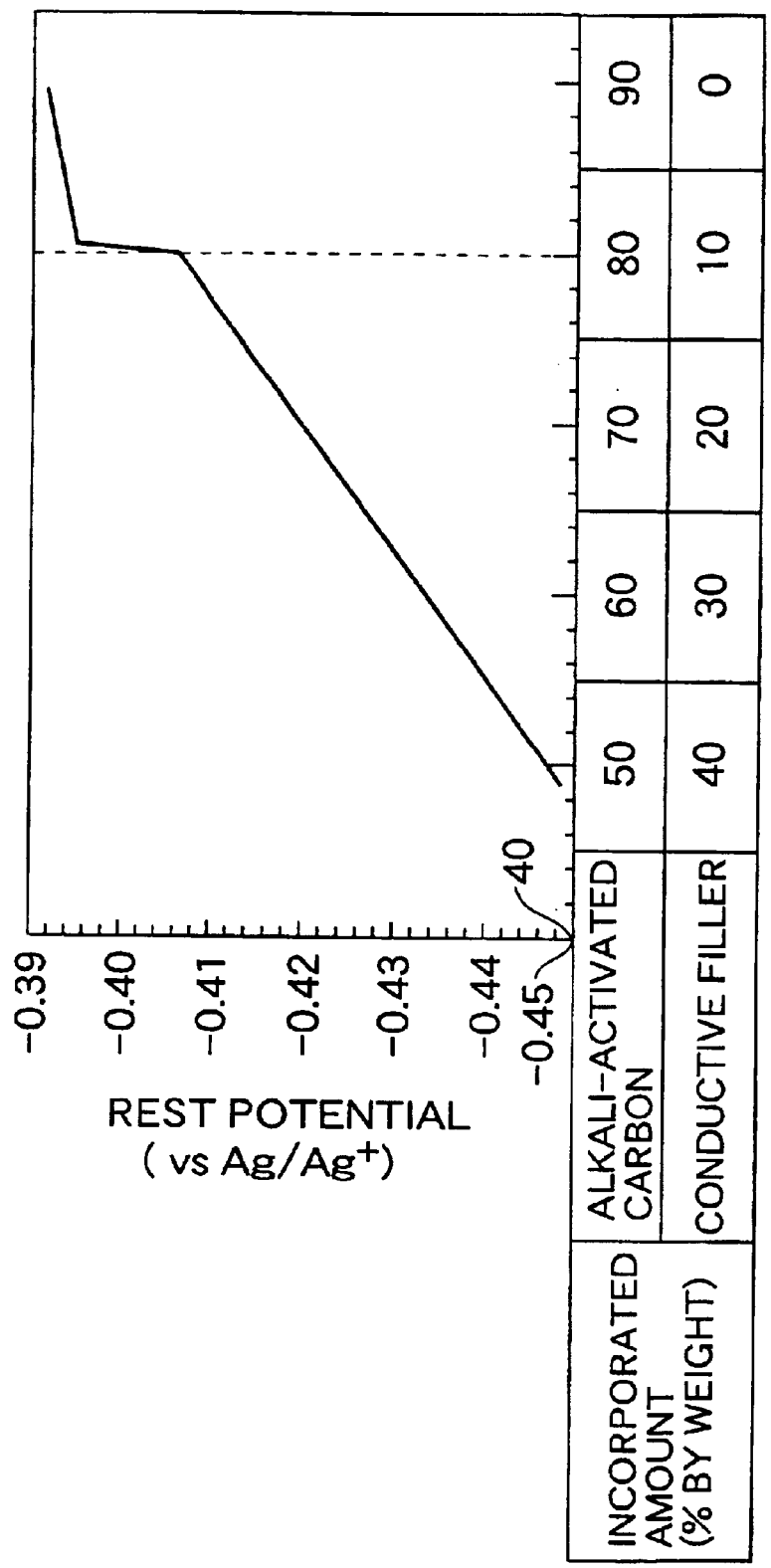
FIG. 4 is a graph showing the relationship between the amounts of alkali-activated carbon and conductive filler incorporated and the rest potential.

Therefore, a graphite powder (made under a trade name of Printex XE2 by Degussa, Co.) as a conductive filler was blended to the KOH-activated carbon in order to shift the rest potential of the KOH-activated carbon toward the ideal rest potential, and the rest potential of the KOH-activated carbon including the conductive filler blended thereto was examined in the similar manner described above, thereby providing results shown in FIG. 4. In this case, each of the positive and negative electrodes includes 10% by weight of PTFE incorporated as a binder. This applies to examples which will be described hereinafter. It can be seen from FIG. 4 that if the amount Fc of conductive filler incorporated is smaller than 10% by weight, the influences provided by the binder of PTFE and the current collector made of the aluminum foil are large, resulting in no effect, but if Fc $\geqq$10% by weight, the rest potential is decreased gradually.

Figure 5:
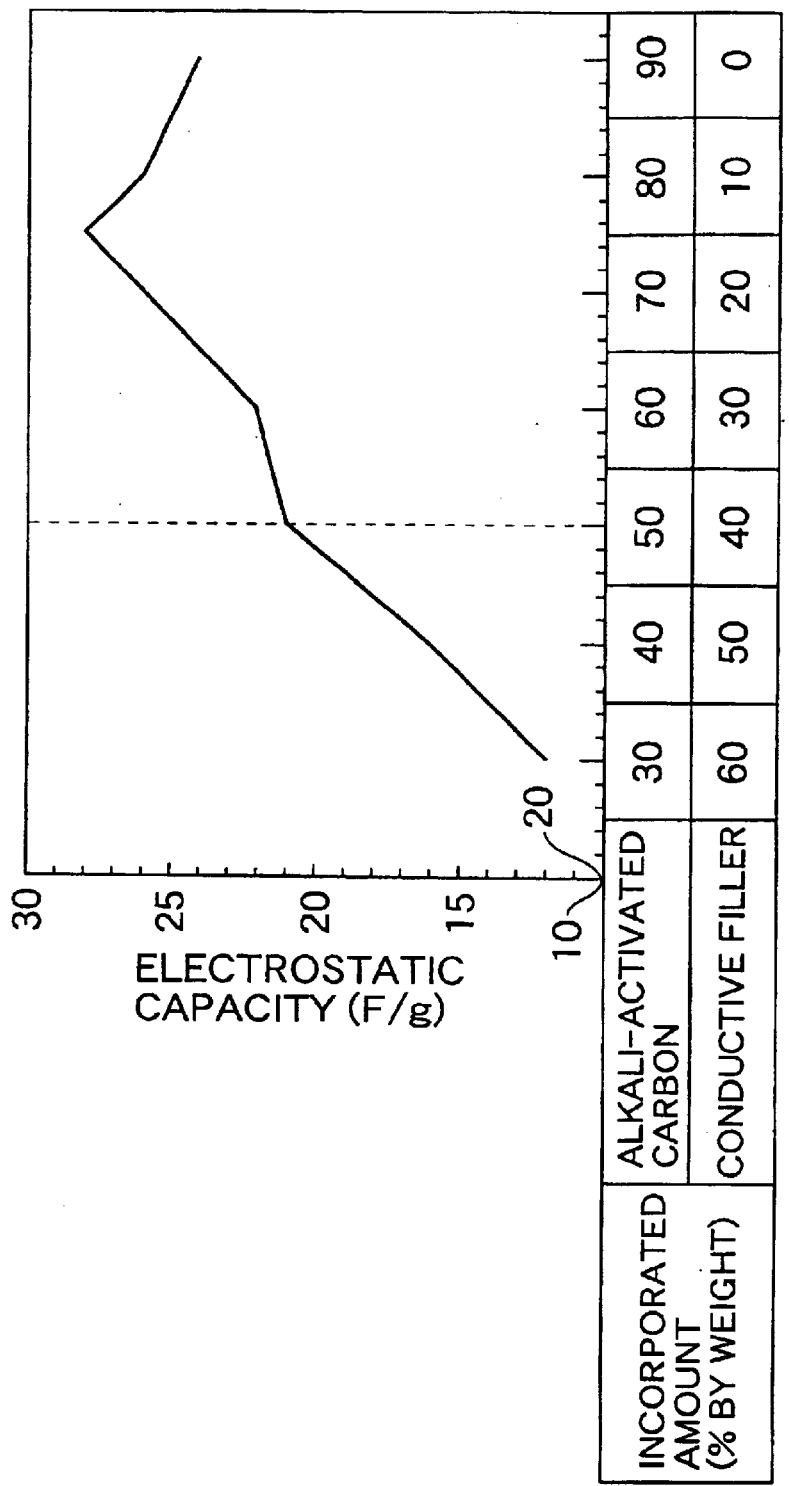
FIG. 5 is a graph showing the relationship between the amounts of alkali-activated carbon and conductive filler incorporated and the electrostatic capacity.

To determine an upper limit value for the amount of conductive filler incorporated, various electric double-layer capacitors each provided with positive and negative electrodes made using conductive fillers incorporated in different amounts were prepared, and electrostatic capacities (F/g) of the electric double-layer capacitors were determined by discharging electric double-layer capacitors at a current density of 50 mA/cm$^2$, thereby providing results shown in FIG. 5. It can be seen from FIG. 5 that when the amount Fc of conductive filler incorporated is larger than 40% by weight, the electrostatic capacity is decreased suddenly. Therefore, an upper limit value for the amount Fc of conductive filler incorporated is set at 40% by weight.

Figure 6:
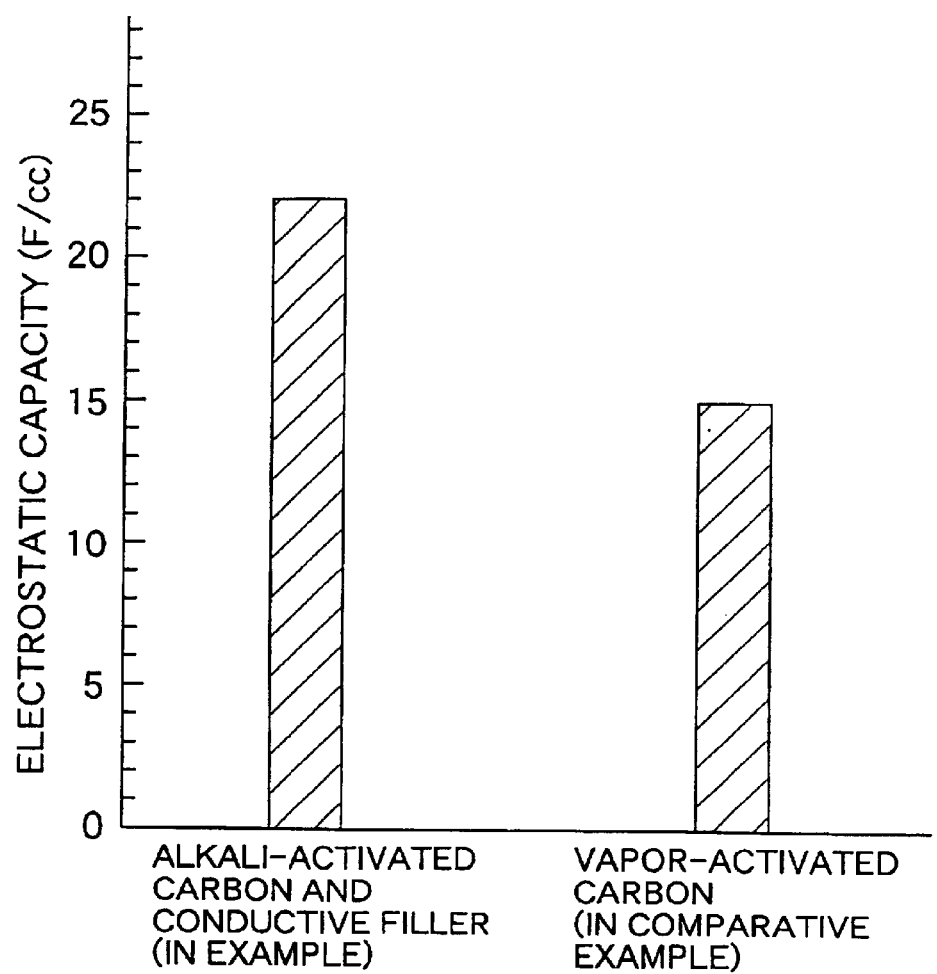
FIG. 6 is a graph showing the electrostatic capacities in an example and a comparative example.

FIG. 6 shows results of a charging test for an electric double-layer capacitor (an example of the present invention) including positive and negative electrodes each having KOH-activated carbon and 27% by weight of a conductive filler and an electric double-layer capacitor (a comparative example) including positive and negative electrodes each having vapor-activated carbon. It can be seen from FIG. 6 that the electrostatic capacity (F/cc) can be increased largely by using KOH-activated carbon.

Then, to examine the durability of an electric double-layer capacitor, electric double-layer capacitors each including positive and negative electrodes with conductive fillers incorporated in amounts Fc set at 40% by weight and 10% by weight were prepared as examples 1 and 2, respectively. On the other hand, an electric double-layer capacitor including positive and negative electrodes made from KOH-activated carbon and a binder without incorporation of a conductive filler was prepared as another comparative example.

Figure 7:
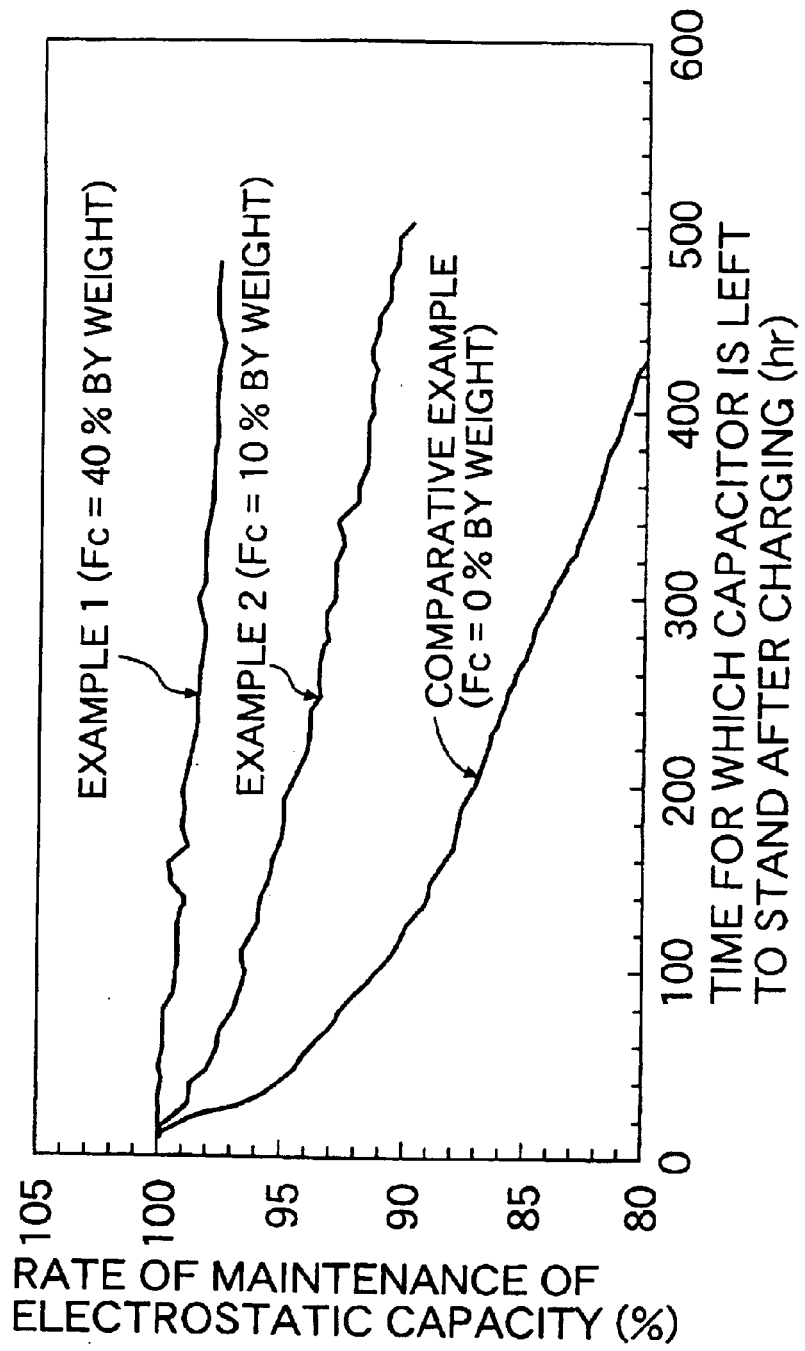
FIG. 7 is a graph showing the relationship between the time for which the capacitor is left to stand after charging and the rate of maintenance of the electrostatic capacity.

Voltage of 2.7 V was applied to each of the capacitors and then, each of the capacitors was left to stand in an atmosphere at 45° C., whereby the relationship between the time for which each of the capacitors was left to stand and the rate of electrostatic capacity maintained, thereby providing results shown in FIG. 7. It can be seen from FIG. 7 that each of examples 1 and 2 has excellent durability.

TEA.BF$_4$ [(C$_2$H$_5$)$_4$N.BF$_4$ (tetraethyl ammonium borofluoride)] or the like may be also used as a solute, and Denka Black (a trade name) made by Denki Kagaku Kogyo Kabushiki Kaisha, and Ketjen Black (a trade name) made by Mitsubishi Chemicals, Corp., or the like may be also used as a conductive filler.

According to Embodiment I, the electrostatic capacity of the electric double-layer capacitor can be increased, and the durability of the electric double-layer capacitor can be enhanced.

Embodiment II

Figure 8:
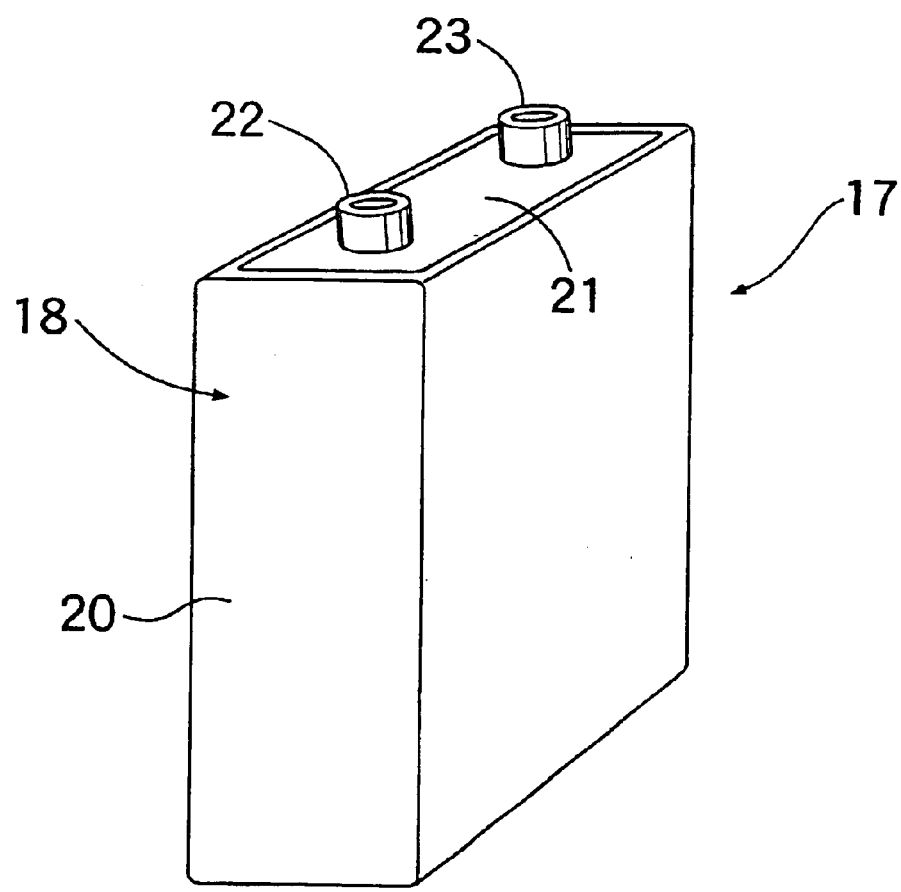
FIG. 8 is a perspective view of a rectangular electric double-layer capacitor.
Figure 9:
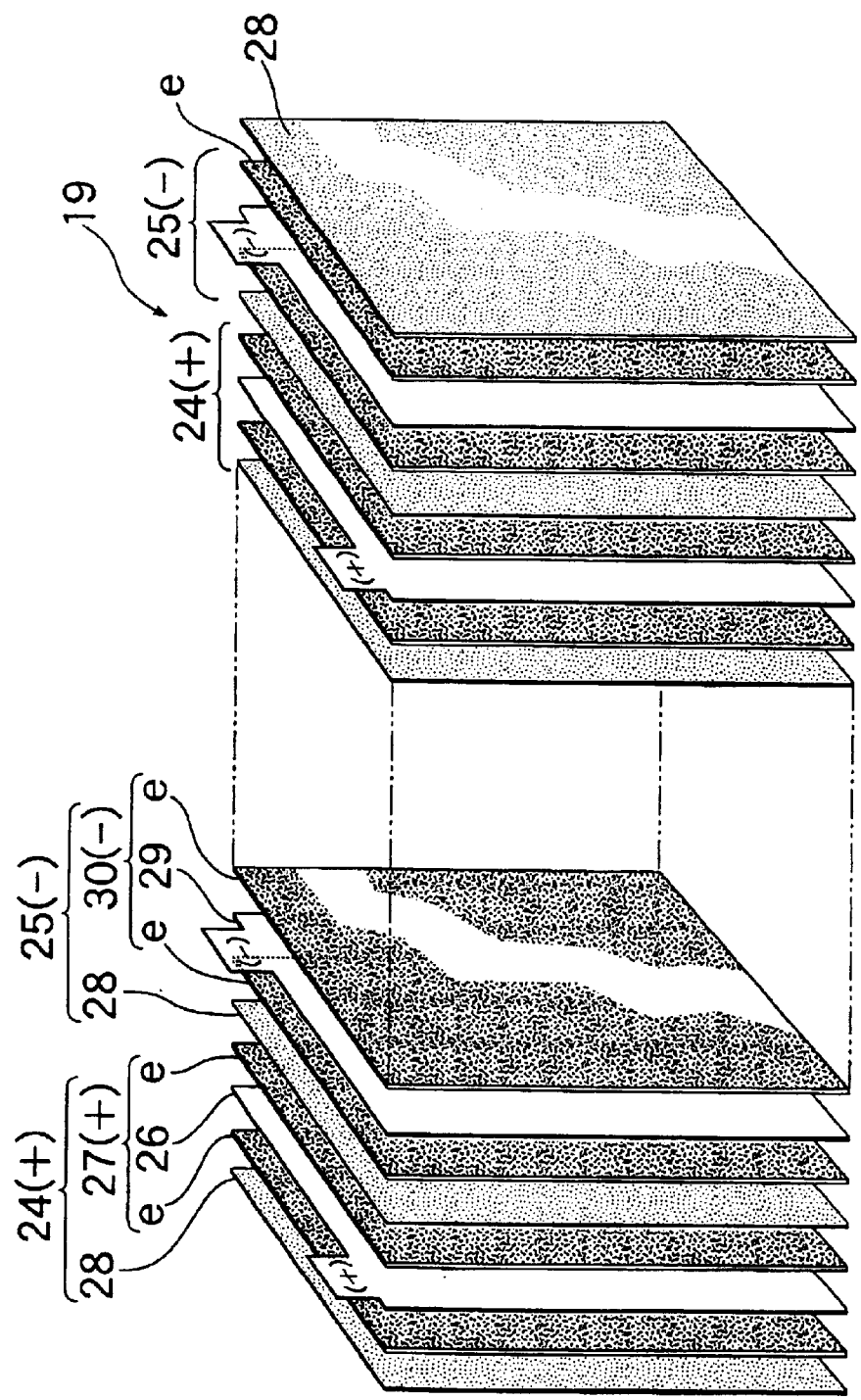
FIG. 9 is an exploded perspective view of an electrode laminate.

Referring to FIGS. 8 and 9, a rectangular electric double-layer capacitor 17 includes a container 18 made of aluminum (Al), an electrode laminate structure 19 accommodated within the container 18, and an electrolyte poured into the container 18. The container 18 comprises a bottomed rectangular cylindrical body 20, and a terminal plate 21 which closes an opening in one end of the bottomed rectangular cylindrical body 20. Positive and negative terminals 22 and 23 are provided on the terminal plate 21.

The electrode laminate structure 19 has a plurality of positive electrode laminates 24 and a plurality of negative electrode laminates 25, which are arranged alternately. Each of the positive electrode laminates 24 comprises a positive electrode plate 27 comprised of polarizing electrodes a affixed respectively to opposite surfaces of a current collector 26 made of an aluminum foil by an adhesive including a conductive filler, and a separator 28 made of PTFE (polytetrafluoroethylene) and superposed onto one of the polarizing electrodes e of the positive electrode plate 27. Each of the negative electrode laminates 25 comprises a negative electrode plate 30 comprised of polarizing electrodes a affixed respectively to opposite surfaces of a current colletor 29 made of an aluminum foil by an adhesive including a conductive filler, and a separator 28 made of PTFE and superposed onto one of the polarizing electrodes e of the negative electrode plate 30 located on the side of the negative electrode plate 27. The separator 28 is opposed to the exposed polarizing electrode e of the positive electrode plate 27. The separator 28 is superposed on the exposed polarizing electrode e of the negative electrode laminate 25 opposed to an inner surface of the container 18. An electrolyte is retained in each of the separators 28 in an impregnated manner.

Figure 10:
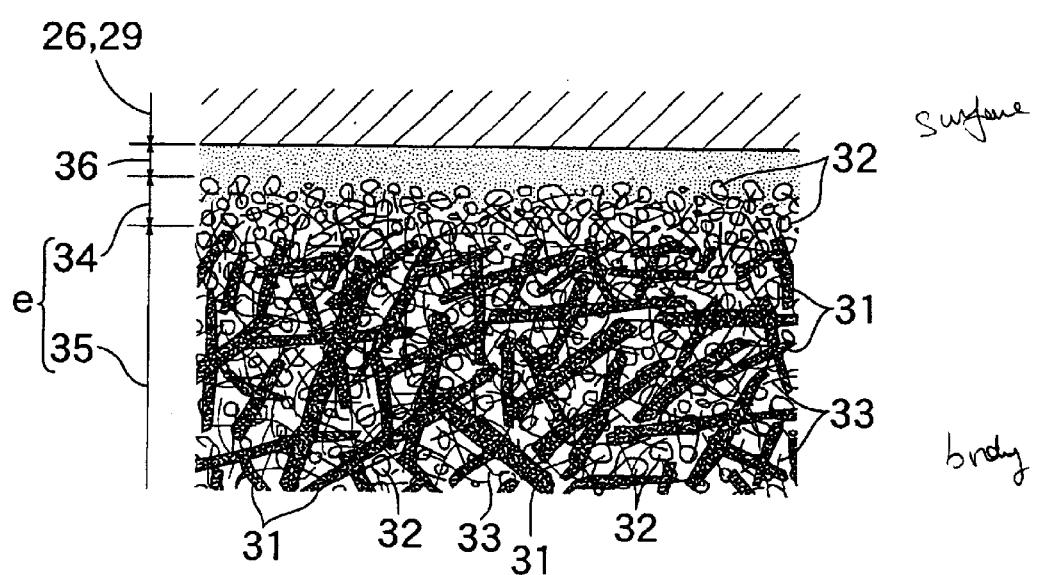
FIG. 10 is a diagram illustrating the structure of bonding of a current collector and a polarizing electrode.

As shown in FIG. 10, each of the polarizing electrodes e is formed from a fibrous active material 31, a particulate conductive material 32 and a binder 33 assuming a stringy shape to connect the fibrous active material 31 and the particular conductive material 32 to each other. In the polarizing electrode e, the concentration of the conductive material in a surface portion 34 of the electrode bonded to the collectors 26, 29 is higher than that in an interior portion 35 of the electrode.

When the electrode surface portion 34 having such a decreased resistance realized is bonded to the collectors 26, 29 by an adhesive 36 including a conductive filler, the adhesive 36 is regarded as a portion of the collectors 26, 29. Therefore, it is possible to decrease the resistance of contact between the collectors 26, 29 and the electrode surface portion 34, thereby decreasing the internal resistance of the electric double-layer capacitor 17.

The polarizing electrode e having the above-described configuration is produced from a sheet-shaped polarizing electrode formed by subjecting an electrode blend to one or more runs of a rolling treatment. The electrode blend comprises the fibrous active material 31, the particulate conductive material 32 and the binder 33, as described above. One example of the fibrous active material 31 used is fibrous meso-phase activated carbon which is made by subjecting meso-phase pitch as a starting material to a spinning, or to a spinning followed by a pulverizing treatment. The fibrous active material 31 has a diameter in a range of 5 to 30 $\mu$m and a length equal to or smaller than 100 $\mu$m. Examples of the particulate conductive material 32 used are a graphite powder, and carbon blacks such as acetylene black and Ketchen black. The particulate conductive material has a particle size in a range of 1 nm to 100 $\mu$m. Further, a PTFE powder is used as the binder 17.

When such blend is subjected to a rolling treatment, the fibrous meso-phase activated carbon particles flow smoothly while rubbing, one another, causing the fine graphite powder existing between the carbon particles to be forced out from between the carbon particles to transfer the fine graphite powder toward the electrode surface portion 34, because the fibrous meso-phase activated carbon has a high graphitized degree and a high hardness. Therefore, the amount of the graphite powder in the electrode surface portion 34 is correspondingly increased if the number of runs of the rolling treatment is increased and hence, the resistance of the electrode surface portion 34 is decreased gradually. The electrode surface portion 34 is formed on each of opposite surfaces of the sheet-shaped polarizing electrode.

Particular examples will be described below.

EXAMPLE I

Eighty-seven % by weight of fibrous meso-phase activated carbon having a diameter of 5 to 30 $\mu$m and a length of 100 $\mu$m or less, 10% by weight of acetylene black having a particle size of 1 nm to 100 $\mu$m, and 3% by weight of a binder comprising a PTFE powder were blended together. The blend was subjected to an extrusion, thereby forming four extruded sheets having different thickness. The extruded sheets were subjected to one, three, five and seven runs of a rolling treatment, respectively, to form four sheet-shaped polarizing electrodes having the same thickness.

Table 1 shows the relationship between the thickness of the extruded sheets and the number of runs of the rolling treatment and the thickness of the sheet-shaped polarizing electrodes.

TABLE 1

| Thickness of extruded sheet ($\mu$m) | Number of runs of rolling treatment | | | |
| --- | --- | --- | --- | --- |
| | One | Three | Five | Seven |
| 200 | 180 | — | — | — |
| 247 | 222 | 180 | — | — |
| 304 | 274 | 222 | 180 | — |
| 377 | 339 | 274 | 222 | 180 |
| | Thickness of sheet-shaped polarizing electrode ($\mu$m) | | | |

Each of the sheet-shaped polarizing electrodes was affixed to each of opposite surfaces of a band-shaped current colletor, using an adhesive including a conductive filler. The resulting material was subjected to a punching to produce twenty positive electrode plates 27 each having a length of 70 mm and a width of 60 mm and twenty negative electrode plates 30 each having the same size as the positive electrode plate 27. A rectangular electric double-layer capacitor 17 as shown in FIGS. 1 and 2 was produced using these positive and negative electrodes plates. The electric double-layer capacitor 17 was charged and discharged at 30 A, and an internal resistance thereof was measured, thereby providing results shown in Table 2.

TABLE 2

| Sheet-shaped polarizing electrode | Internal resistance of electric double-layer capacitor (m$\Omega$) |
| --- | --- |
| Electrode made by one run of rolling treatment | 4.5 |
| Electrode made by three runs of rolling treatment | 3.5 |
| Electrode made by five runs of rolling treatment | 2.8 |
| Electrode made by seven runs of rolling treatment | 2.6 |

It can be seen from Table 2 that if the number of runs of the rolling treatment is increased, the resistance of contact between the collectors 26, 29 and the polarizing electrode e is correspondingly decreased and hence, the internal resistance of the electric double-layer capacitor 17 is decreased. In this case, if the practicality and productivity of the electric double-layer capacitor 17 are taken into consideration, the 10 internal resistance of the electric double-layer capacitor 17 is suitable to be equal to or lower than 2.7 m$\Omega$ and hence, the number of runs of the rolling treatment is suitable to be seven or more.

EXAMPLE II

Eighty-two % By weight of fibrous meso-phase activated carbon having a diameter of 5 to 30 $\mu$m and a length of 100

μm or less, 10% by weight of acetylene black having a particle size of 1 nm to 100 μm, and 8% by weight of a binder comprising a PVDF (polyvinylidene fluoride) powder were blended together. A slurry was prepared using 40% by weight of the blend and 60% by weight of NMP (N-methyl-2-pyrrolldone. The slurry was applied to opposite surfaces of the band-shaped current colletor by a doctor blade process, thereby forming a film on each of the opposite surfaces. This treatment was repeatedly conducted to produce four laminated sheets having the films of different thickness. Then, the laminated sheets were subjected to one, three, five and seven runs of a rolling treatment, respectively to form four laminated sheets including sheet-shaped polarizing electrodes having the same thickness. The thickness of each of the films before the rolling treatment is equal to that of each of the extruded sheets shown in Table 1, and the relationship between the number of runs of the rolling treatment and the thickness of the sheet-shaped polarizing electrode is the same as the relationship between the number of runs of the rolling treatment and the thickness of the sheet-shaped polarizing electrode shown in Table 1.

Each of the laminated sheets produced after the rolling treatment was subjected to a punching to produce twenty positive electrode plates 27 each having a length of 70 mm and a width of 60 mm and twenty negative electrode plates 30 each having the same size as the positive electrode plate 27. A rectangular electric double-layer capacitor 17 as shown in FIGS. 1 and 2 was produced using these positive and negative electrodes plates 27 and 30. The electric double-layer capacitor 17 was charged and discharged at 30 A, and an internal resistance thereof was measured, thereby providing results shown in Table 3.

TABLE 3

| Sheet-shaped polarizing electrode | Internal resistance of electric double-layer capacitor (mΩ) |
| --- | --- |
| Electrode made by one run of rolling treatment | 5.2 |
| Electrode made by three runs of rolling treatment | 3.8 |
| Electrode made by five runs of rolling treatment | 3.2 |
| Electrode made by seven runs of rolling treatment | 3.0 |

It can be seen from Table 3 that if the number of runs of the rolling treatment is increased, the resistance of contact between the collectors 26, 29 and the polarizing electrode e is correspondingly decreased and hence, the internal resistance of the electric double-layer capacitor 17 is decreased. In this case, if the practicality and productivity of the electric double-layer capacitor 17 are taken into consideration, the internal resistance of the electric double-layer capacitor 17 is suitable to be equal to or lower than 3.0 mΩ and hence, the number of runs of the rolling treatment is suitable to be seven or more.

According to Embodiment II, it is possible to provide an electric double-layer capacitor designed so that the resistance of contact between the collector and the polarizing electrode can be decreased. Thus, the internal resistance of the capacitor can be decreased.

EMBODIMENT III

This embodiment is intended for a cylindrical electric double-layer capacitor 1 as shown in FIGS. 1 and 2. In this case, each of band-shaped polarizing electrodes a is formed by applying an electrode forming slurry to each of band-shaped current collectors 11 and 14 to form a film under utilization of a doctor blade process, and drying the film.

The electrode forming slurry includes CMC (sodium carboxymethyl cellulose) added as a thickening agent in addition to activated carbon, a conductive filler and a binder. Meso-phase activated carbon made using meso-phase pitch as a starting material is used as the activated carbon and produced through an alkali-activating treatment. A graphite powder is used as the conductive filler, and PTFE and SBR (styrene-butadiene rubber) are used as the binder.

Figure 11:
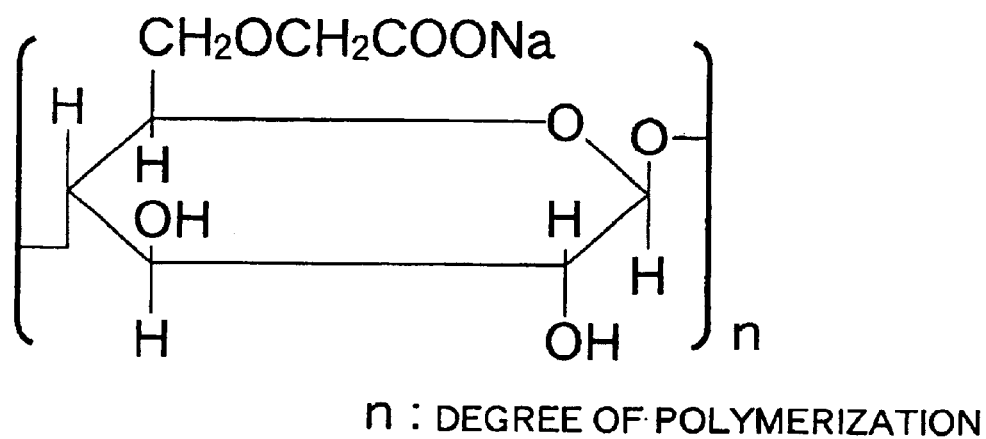
FIG. 11 is a chemical formula of CMC.

CMC has a chemical structure shown in FIG. 11. In the chemical structure, OH group contributes to the dispersion property of the meso-phase activated carbon, and carboxymethyl group contributes to the strength of the electrode. In FIG. 11, one OH group in one unit of glucose anhydride is substituted with one carboxymethyl group and hence, the degree De of etherification of the CMC is equal to 1. Therefore, when the degree of polymerization of the CMC is n, and the number of carboxymethyl groups in the entire CMC is a, the degree De of etherification is equal to a/n. Therefore, De=0.6 means that glucose anhydride with OH groups not substituted with carboxymethyl groups is included in the CMC.

From the viewpoints of an enhancement in dispersion property of the meso-phase activated carbon and of an increase in strength of the electrode, the amount of CMC incorporated is set in a range of 0.5% by weight≦CMC≦3.0% by weight, when the sum of the amounts of solids incorporated, such as meso-phase activated carbon, graphite powder, PTFE and SBR and the amount of CMC incorporated is defined to be 100% by weight. However, if CMC<0.5% by weight, the meso-phase activated carbon particles are agglomerated. On the other hand, if CMC >3.0% by weight, the durability of the polarizing electrode e is reduced. The amount of CMC incorporated can be determined in this range, but from the viewpoint of the durability of the polarizing electrode e, the amount of CMC incorporated may be smaller. For example, if CMC having a degree of etherification De in a range of 0.65 De 0.75 and with a viscosity η of a 1% aqueous solution of CMC being in a range of 6,500 mPa·s η 8,000 mPa·s is used, the amount of CMC incorporated can be suppressed to about 0.5% by weight.

Particular examples will be described below. First, a blend having the following composition was prepared:

| | |
| --- | --- |
| Meso-phase activated carbon | 85% by weight |
| Graphite powder | 7% by weight |
| PTFE | 6% by weight |
| SBR | 1% by weight |
| CMC | 1% by weight |

Then, 30% by weight of the blend and 70% by weight of water were mixed together, and the resulting mixture was agitated sufficiently to prepare an electrode forming slurry. The CMC having a degree De of etherification in a range of 0.5≦De≦1.2 was used.

The slurry was applied to one surface of a band having a thickness of 40 μm and delivered from an aluminum foil roll by a doctor blade process, and was then dried to form a polarizing electrode e having a thickness of 280 μm. The slurry was also applied to the other surface of the band in a similar manner and then dried to form a polarizing electrode e having a thickness of 280 μm.

The dispersion property of the meso-phase activated carbon in each of the various slurries and the strength of each of the polarizing electrodes e were examined, thereby providing results shown in Table 4.

TABLE 4

| | CMC | | Dispersion property of | |
|---|---|---|---|---|
| Degree De of etherification | OH group | Carboxy-methyl group | meso-phase activated carbon | Strength of polarizing electrode |
| 0.5 | More | Less | Passable | Low |
| 0.6 | ↑ | | Passable | High |
| 0.7 | | | Good | High |
| 0.9 | | | Passable | High |
| 1.0 | | ↓ | Failure | Low |
| 1.2 | Less | More | Failure | Low |

In the column of dispersion property in Table 4, "Good" corresponds to a case where there is no agglomerate; "Passable" corresponds to a case where there are some agglomerates, but there is practically no problem; and "Failure" corresponds to a case where there are a large number of agglomerates, resulting in a non-practicality. In the column of strength, "High" corresponds to a case where no crack has been produced in the polarizing electrode e by the flexure similar to that of the electrode winding 3, and "Low" corresponds to a case where the crack has been produced in the electrode e. It can be seen from Table 4 that the use of CMC having a degree De of etherification in a range of $0.6 \leq De \leq 0.9$ is meaningful.

According to embodiment III, it is possible to provide an electrode forming slurry for an electric double-layer capacitor, in which the meso-phase activated carbon can be dispersed homogeneously or substantially homogeneously and from which an electrode having a high strength can be produced under utilization of a doctor blade process, and it is also possible to provide an electrode for an electric double-layer capacitor, which has a high strength.

What is claimed is:

1. An electrode for an electric double-layer capacitor having a single layer comprising an active material and a conductive material, the electrode being bonded to a current collector, wherein the concentration of said conductive material in a surface portion of the electrode bonded to said current collector is higher than the concentration of a conductive material in an internal portion of the electrode, the higher concentration of the conductive material in the surface portion of the electrode being obtained by subjecting said conductive material to two or more runs of a rolling treatment.

2. An electrode for an electric double-layer capacitor according to claim 1, wherein said active material is fibrous mesophase activated carbon.

3. An electrode for an electric double-layer capacitor according to claim 1, wherein said conductive material is subjected to seven or more runs of the rolling treatment.

* * * * *